US009330250B2

(12) United States Patent
Medvinsky et al.

(10) Patent No.: US 9,330,250 B2
(45) Date of Patent: May 3, 2016

(54) AUTHORIZATION OF MEDIA CONTENT TRANSFER BETWEEN HOME MEDIA SERVER AND CLIENT DEVICE

(71) Applicant: General Instrument Corporation, Horsham, PA (US)

(72) Inventors: Alexander Medvinsky, San Diego, CA (US); Jay Strater, San Diego, CA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 92 days.

(21) Appl. No.: 14/272,426

(22) Filed: May 7, 2014

(65) Prior Publication Data

US 2014/0337927 A1    Nov. 13, 2014

Related U.S. Application Data

(60) Provisional application No. 61/820,488, filed on May 7, 2013.

(51) Int. Cl.
*H04L 29/06* (2006.01)
*G06F 21/44* (2013.01)
(Continued)

(52) U.S. Cl.
CPC ............ *G06F 21/44* (2013.01); *H04N 21/4147* (2013.01); *H04N 21/41407* (2013.01); *H04N 21/4325* (2013.01); *H04N 21/4334* (2013.01); *G06F 2221/2129* (2013.01)

(58) Field of Classification Search
CPC . G06F 21/10; G06F 21/44; G06F 2221/2129; H04N 21/41407; H04N 21/4147; H04N 21/4325; H04N 21/4334; H04N 21/4627; H04L 2463/101; H04L 2209/603

USPC ........................................................... 726/4
See application file for complete search history.

(56) References Cited

U.S. PATENT DOCUMENTS

| 2006/0218650 A1* | 9/2006 | Costa-Requena ....... G06F 21/10 726/27 |
| 2007/0157295 A1* | 7/2007 | Mangalore .............. G06F 21/10 726/6 |

(Continued)

FOREIGN PATENT DOCUMENTS

| EP | 2265014 A2 | 12/2010 |
| WO | 2012/094487 A2 | 7/2012 |

OTHER PUBLICATIONS

PCT Search Report & Written Opinion, RE: Application #PCT/US2014/037216; dated Nov. 5, 2014.

(Continued)

*Primary Examiner* — Yogesh Paliwal
(74) *Attorney, Agent, or Firm* — Thomas A. Ward

(57) ABSTRACT

A method for authorizing media content transfer between a home media server and a client device and provisioning DRM credentials on the client device, the method comprising receiving a service authorization credential at a client authorization server from a PKI provisioning server, wherein the service authorization credential is associated with a client device, and sending a validation response from the client authorization server to the PKI provisioning server if the client authorization server determines that the service authorization credential was previously provided by the client authorization server to the client device, wherein the validation response releases the PKI provisioning server to send DRM credentials to the client device.

7 Claims, 9 Drawing Sheets

(51) Int. Cl.
*H04N 21/414* (2011.01)
*H04N 21/4147* (2011.01)
*H04N 21/432* (2011.01)
*H04N 21/433* (2011.01)

(56) References Cited

U.S. PATENT DOCUMENTS

2010/0058485 A1* 3/2010 Gonzalez ............... G06F 21/10
   726/27
2011/0213969 A1 9/2011 Nakhjiri et al.
2012/0151570 A1* 6/2012 Cooppan ............ H04L 63/0823
   726/10
2013/0152174 A1* 6/2013 Raley .................... G06F 21/31
   726/4

OTHER PUBLICATIONS

PCT Invitation to Pay Additional Fees (Form PCT/ISA/206), RE: Application #PCT/US2014/037216; dated Aug. 19, 2014.

* cited by examiner

AUTHORIZATION OF MEDIA CONTENT TRANSFER BETWEEN HOME MEDIA SERVER AND CLIENT DEVICE

CLAIM OF PRIORITY

This application claims priority under 35 U.S.C. §119(e) from earlier filed U.S. Provisional Application Ser. No. 61/820,488, filed May 7, 2013, which is hereby incorporated by reference.

TECHNICAL FIELD

The present disclosure relates to the field of digital video recording and streaming, particularly a system for authorizing client devices and home media servers to securely stream media content from the home media server to the client device.

BACKGROUND

Consumers have come to enjoy accessing media content on-demand on non-television devices, such as mobile phones or tablet computers, by streaming media content over the internet or downloading media content to the device. Consumers also enjoy watching television broadcasts, either in real time or through digital video recorders (DVRs) whereby broadcasts can be recorded and viewed at a later time.

However, it has only recently been common to merge the two media consumption models by allowing recorded content from one device to be streamed or downloaded to another device due to concerns about digital rights management. For instance, equipment such as cable boxes or DVRs have only recently allowed media content, either real time broadcasts or recorded content, to be streamed or downloaded to non-television devices. Although many consumers would enjoy the flexibility of being able to choose whether to watch a live or recorded television broadcast on a non-television device, such as if they are not at home but would still like to watch a particular program on their mobile phone while on the go, most cable boxes and DVRs encrypt their content or have other digital rights management schemes in place to prevent unauthorized copying or transfer of media content.

Some systems are under development that would allow copy-protected content from one device can be accessed with authorization on a secondary device, without allowing unrestricted copying of the media content. For example, Digital Transmission Content Protection over Internet Protocol (DTCP-IP) is a scheme that provides for copy protection of media content as it is moved from one device to another device over a data connection. In a DTCP-IP system, a consumer can record television content on a DVR, then stream that recorded content to a smartphone or other client device over a wireless internet connection while maintaining the content's copy protection and preventing unauthorized copying.

The DVR or other home media server can use DRM credentials, such as DTCP-IP certificates and/or keys, to protect outgoing media content, such that only client devices that have copies of those same DRM credentials can play back the media content.

In some situations and/or embodiments, there can be security and/or financial considerations in providing DRM credentials to client devices or home media servers. By way of a non-limiting example, it can be desired that DRM credentials only be provided to client devices that have previously been registered by a client authorization server, so that unregistered client devices can be impeded from copying DRM protected media content. By way of another non-limiting example, in some situations the DRM credentials may need to be purchased from another entity, such as the Digital Transmission Licensing Administrator (DTLA), and to limit costs it can be desired that DRM credentials only be purchased for client devices that have been previously registered by a client authorization server.

SUMMARY

What is needed is a system and method for authorizing media content transfer between a home media server and a client device, and to provide previously authorized client devices and home media servers with DRM credentials and/or other cryptographic device authentication credentials to allow the transferred media content to be protected.

In one embodiment, the present disclosure provides a process for provisioning DRM credentials on a client device, the process comprising receiving at a client authorization server a service authorization credential from a PKI provisioning server, wherein the service authorization credential is associated with a client device, and sending a validation response from the client authorization server to the PKI provisioning server if the client authorization server determines that the service authorization credential was previously provided by the client authorization server to the client device, wherein the validation response releases the PKI provisioning server to send DRM credentials to the client device.

In another embodiment, the present disclosure provides a process for provisioning DRM credentials on a client device, the process comprising receiving a provisioning request at a home media server from a client device, wherein the provisioning request comprises a service authorization credential, validating the provisioning request at the home media server by sending an activation request to a client authorization server, wherein the activation request comprises the service authorization credential, receiving an activation response at the home media server if the client authorization server validates the provisioning request by verifying the service authorization credential, downloading DRM credentials to the home media server from a PKI provisioning server if the home media server received the activation response, saving DRM certificate identifiers associated with the DRM credentials to the home media server, and sending a provisioning response from the home media server to the client device, wherein the provisioning response comprises the DRM credentials.

BRIEF DESCRIPTION OF THE DRAWINGS

Further details of the present invention are explained with the help of the attached drawings in which.

DETAILED DESCRIPTION

Figure 1:
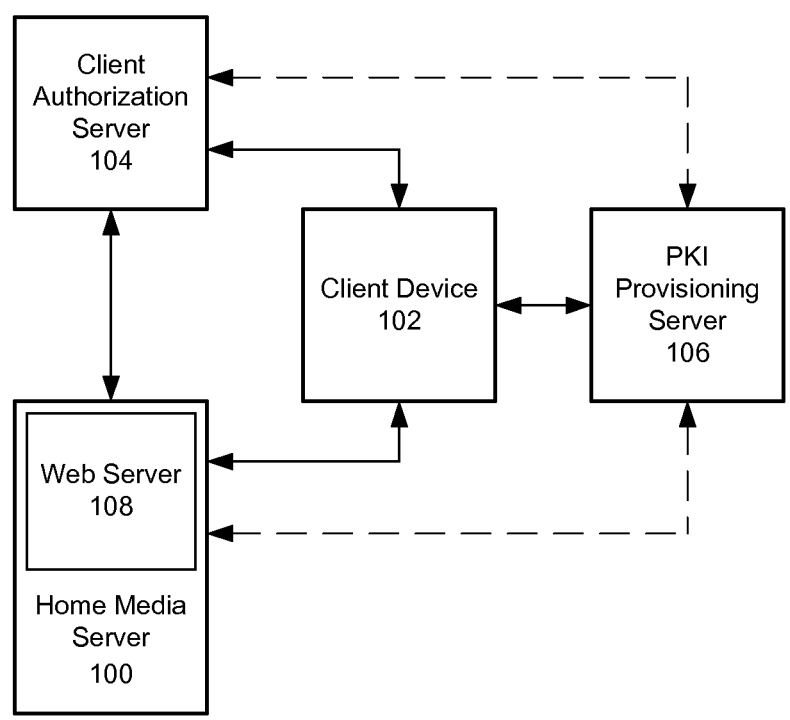
FIG. 1 depicts an exemplary operating environment for authorizing media content transfer between a home media server and a client device.

FIG. 1 depicts an exemplary system for providing media content from a home media server 100 to one or more client devices 102 over a network. The system can comprise a home media server 100, one or more client devices 102, a client authorization server 104, and/or a Public Key Infrastructure (PKI) provisioning server 106.

The home media server 100 can be a digital video recorder (DVR), cable box, streaming media server, or any other device that receives and/or stores media content and can stream and/or transfer the media content over a network to a client device 102. A client device 102 can be a mobile phone, tablet computer, computer, television, gaming device, personal media device, set-top box, or any other device that can stream or receive media content from the home media server 100 over a network for playback and/or storage on the client device 102.

The home media server 100 can comprise a web server 108 that can transmit media content from the home media server 100 to one or more client devices 102 over a network such as the internet, a local area network, or a wide area network. By way of a non-limiting example, a home media server 100 can be a DVR that can receive and/or record television broadcasts, and the home media server 100 can transmit received and/or recorded video through a web server 108 to one or more client devices 102 over the internet. In some embodiments, the web server 108 can be integrated into the home media server 100, such as software and/or firmware running on the home media server 100. By way of a non-limiting example, the web server 108 can be a DLNA server incorporated into the home media server 100.

A client authorization server 104 can authorize specific client devices 102 to receive media content from particular home media servers 100, and/or authorize home media server 100 to transfer media content to client devices 102. The client authorization server 104 can be operated by a network operator, service provider, or any other entity that desires to register client devices 102 to receive media content from home media servers 100 and/or authorize a home media server 100 to transfer media content to client devices 102. In some embodiments, the client authorization server 104 can be a single server, while in other embodiments the client authorization server 104 can be a collection of multiple servers that are in communication with one another.

In some embodiments, the web server 108 can be software or firmware provided by the entity that operates the client authorization server 104, such as a network operator. In some embodiments the entity that operates the client authorization server 104 can also provide software for the client device 102 that can interact with the client authorization server 104 and/or web server 108 as discussed below.

A PKI provisioning server 106 can provide cryptographic keys and/or digital certificates to client devices 102 and/or the home media server 100 as discussed below. In some embodiments the PKI provisioning server 106 can be operated by the same entity that manufactured the home media server 100. In some embodiments the entity that operates the PKI provisioning server 106 can also provide software or a software development kit (SDK) for the client device 102, such that the client device 102 can interact with the PKI provisioning server 106 and/or home media server 100 as discussed below, and can also interact with software provided by the entity that operates the client authorization server 104.

In some embodiments, the PKI provisioning server 106 can be in communication with the client authorization server 104, as discussed below with respect to FIGS. 2 and 3. In alternate embodiments, the PKI provisioning server 106 can be in communication with the home media server 100, as discussed below with respect to FIGS. 4 and 5. In these embodiments, the entity that operates the PKI provisioning server 106 can provide software or an SDK for the home media server 100, such that the home media server 100 can interact with the PKI provisioning server 106.

Figure 2A:
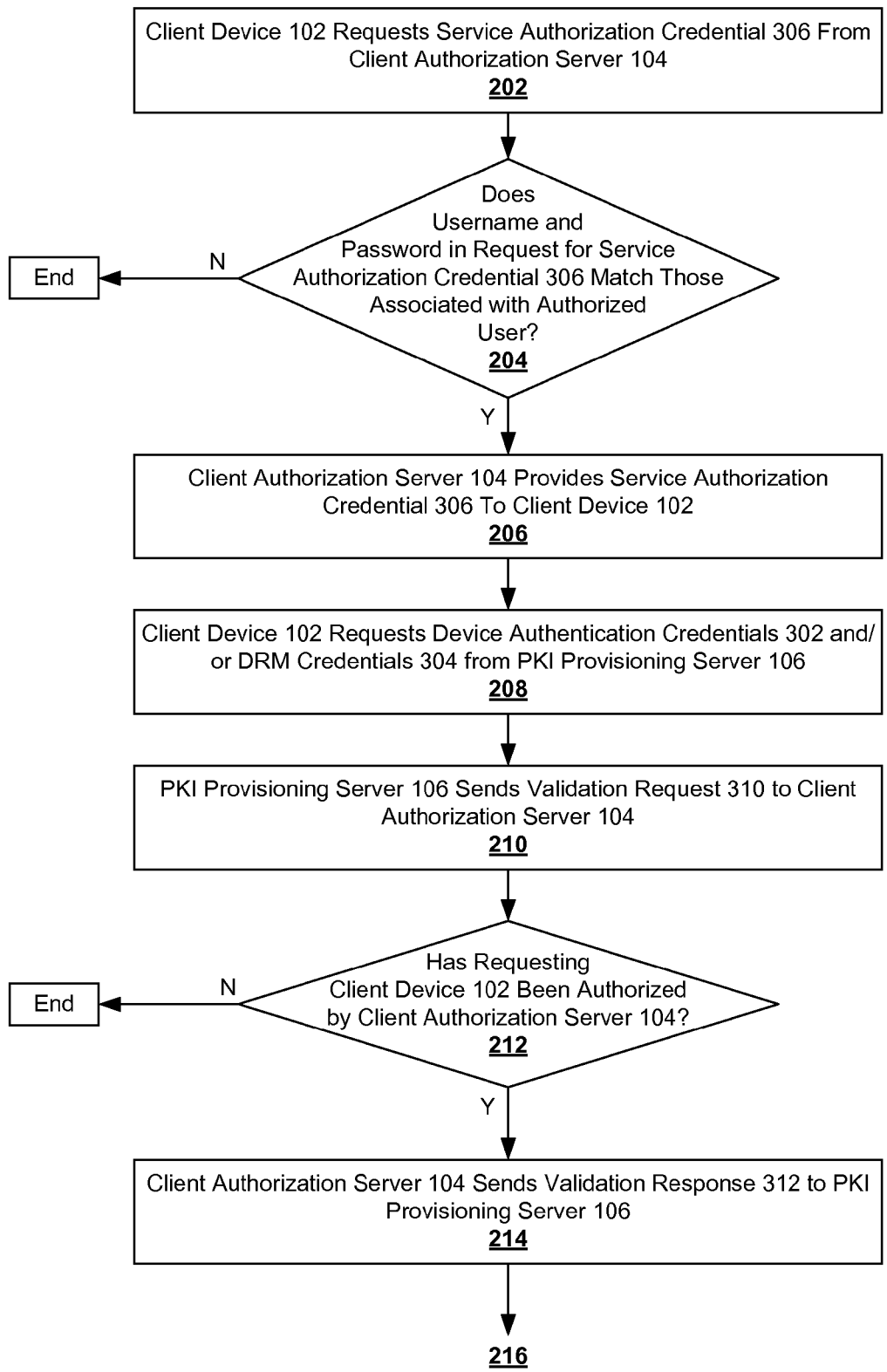
FIGS. 2A-2C depict a first method for authorizing media content transfer between a home media server and a client device and for providing DRM credentials to the client device.
Figure 2B:
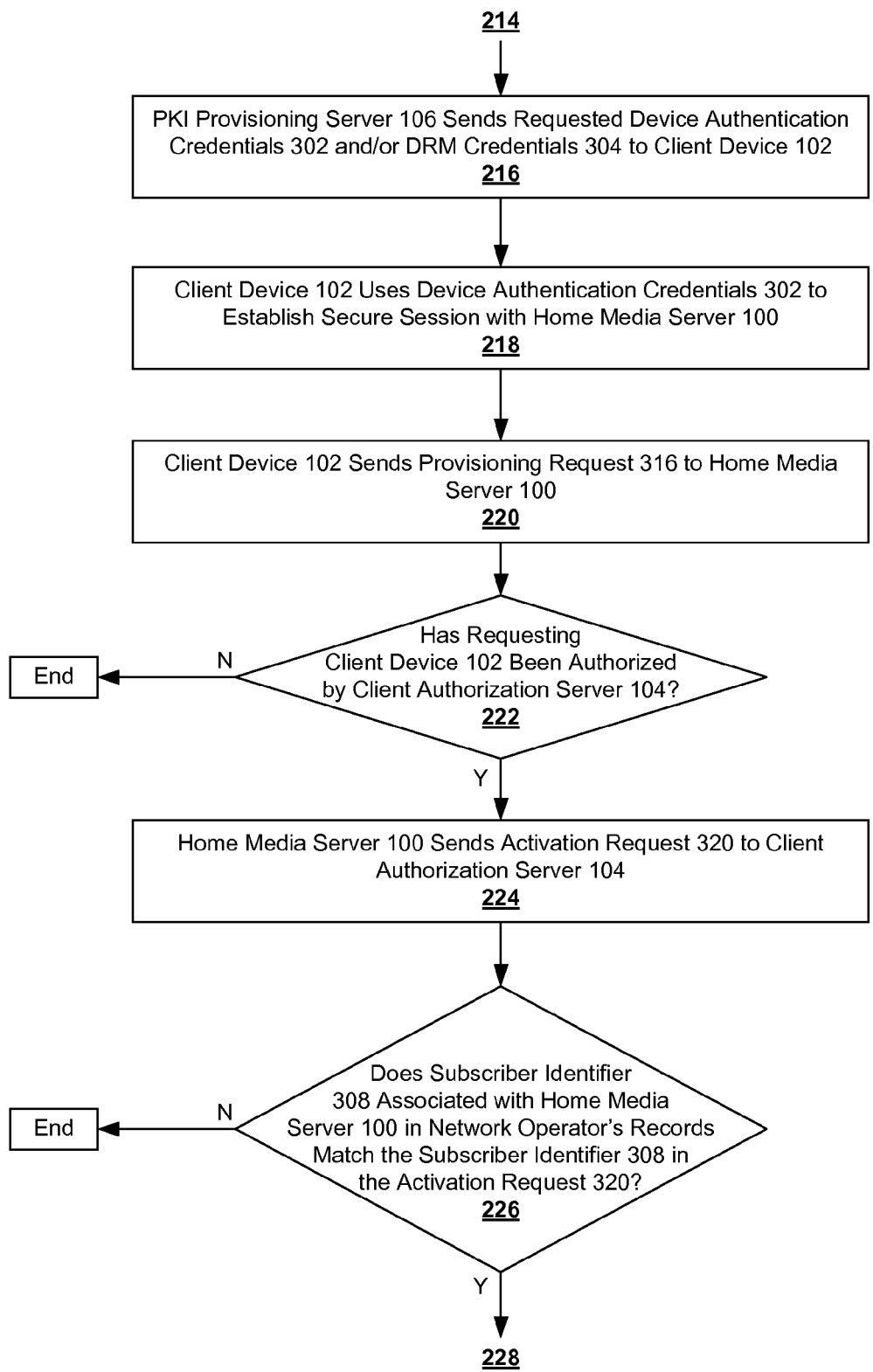
Figure 2C:
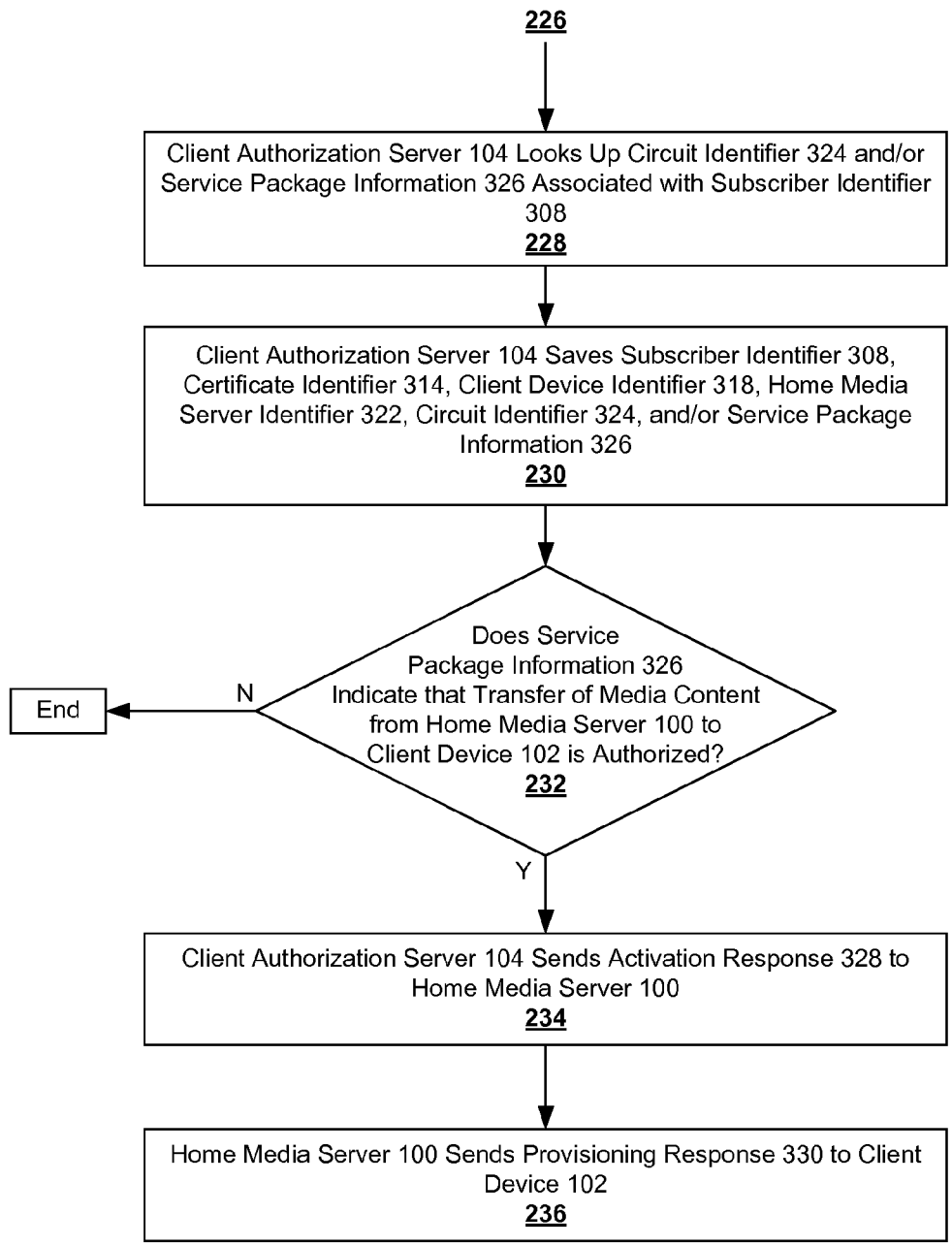
Figure 3:
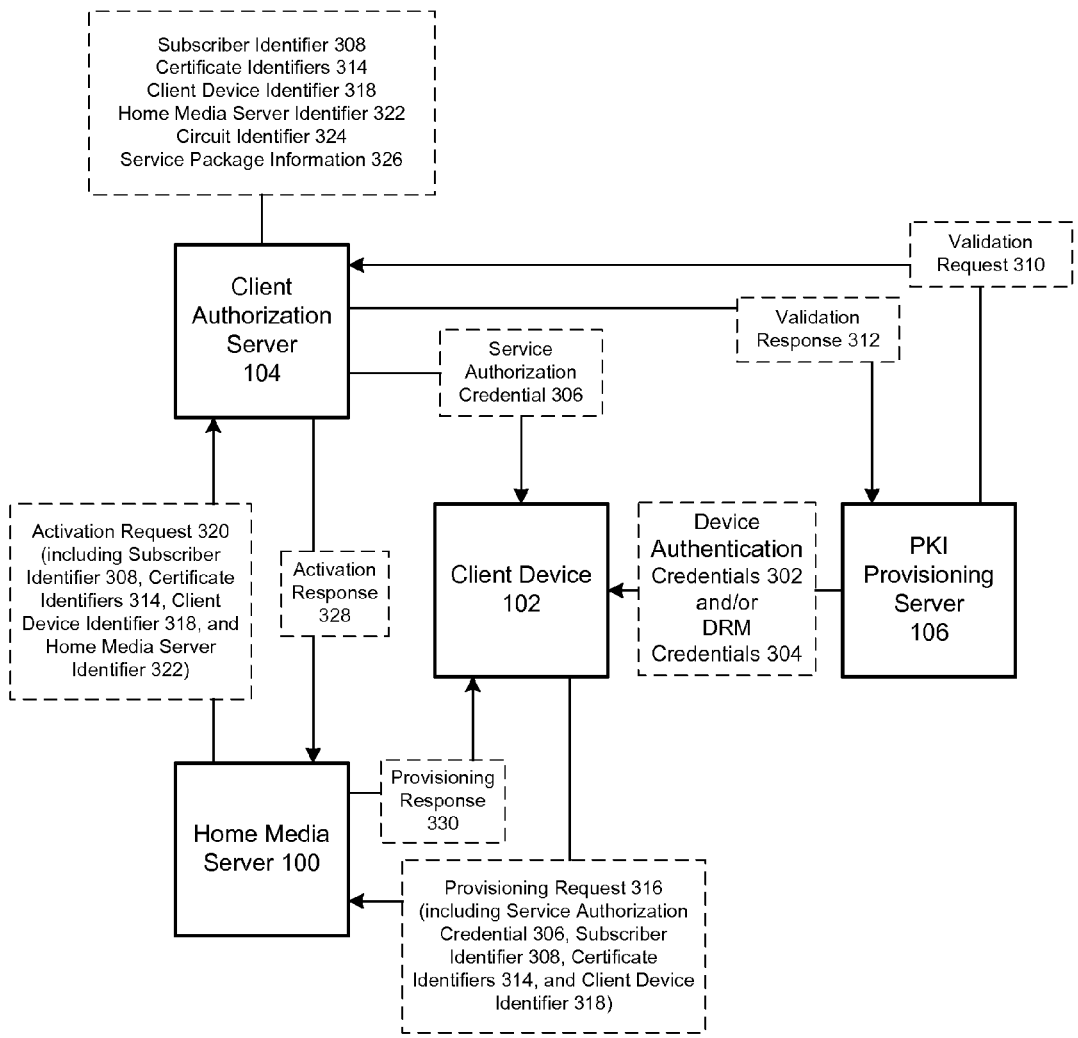
FIG. 3 depicts an exemplary operating environment for practicing the first method of FIGS. 2A-2C.

FIGS. 2A-2C depict a first exemplary process for setting up a client device 102 to receive encrypted media content from a home media server 100 by providing the client device 102 with device authentication credentials 302 and/or digital rights management (DRM) credentials 304. In this embodiment, the system of FIG. 3 can be used, in which the PKI provisioning server 106 can be in communication with the client authorization server 104. In some embodiments, the PKI provisioning server 106 and client authorization server 104 can communicate through a Hypertext Transfer Protocol Secure (HTTPS) connection and/or through a firewall maintained by the client authorization server 104 or the network operator.

At step 202, the client device 102 can request a service authorization credential 306 from the client authorization server 104. In some embodiments, the service authorization credential 306 can be a cookie. A cookie in this context can be a digital object that can be decrypted and cryptographically validated by the client authorization server 104 after matching a keyed hash value or validating a digital signature. In other embodiments, the service authorization credential 306 can be a one-time password, secret key, digital certificate, or any other type of credential.

In some embodiments the client device 102, as part of a request for a service authorization credential 306, can forward a username and password to the client authorization server 104. The username and password can be tied to a user account with a network operator that operates the client authorization server 104 and that provides services and/or network access to the client device 102. By way of a non-limiting example, a telecommunications provider can provide each of its subscribers with a user account. Each subscriber can use their user account to activate and/or access services on one or more client devices 102 that the subscriber owns, rents, manages, or otherwise possesses.

Each user account, username, and password can be associated with a subscriber identifier 308. The subscriber identifier 308 can be a unique identifier associated with a particular subscriber, user, or user account, such as a number, alphanumeric code, or any other type of identifying information. By way of a non-limiting example, a network operator, such as a cable company, can assign a subscriber identifier 308 to each of the subscribers to its service. Each client device 102 can be associated with the subscriber identifier 308 of the user that owns or possesses the client device 102.

At step 204, the client authorization server 104 can determine whether the username and password submitted by the client device 102 matches a username and password associated with an authorized user account in the network operator's records. By way of a non-limiting example, a network operator can provide the client authorization server 104 with access to a database of usernames and passwords for subscribers that have been authorized to access the network operator's network and/or services. If the client authorization server 104 verifies that the username and password submitted by the client device 102 matches a username and password associated with one of its authorized user accounts, the client authorization server 104 can send a service authorization credential 306 to the client device 102 at step 206. The service authorization credential 306 can indicate that the client device 102 has been registered with the network operator. If the client authorization server 104 does not verify that the username and password submitted by the client device 102 matches a username and password associated with one of its authorized user accounts, the client authorization server 104 can reject the request and the process can end.

In alternate embodiments steps 202-206 can be skipped, and the client device 102 can locally generate the service authorization credential 306 from a username and/or password entered into the client device 102 by a user. The client device 102 can encrypt the username and/or password to create the service authorization credential 306. In some embodiments, the username can be the subscriber identifier 308.

At step 208, the client device 102 can request device authentication credentials 302 and/or DRM credentials 304 from the PKI provisioning server 106. The client device 102 can forward the service authorization credential 306, as well as its associated subscriber identifier 308, to the PKI provisioning server 108 as part of its request for device authentication credentials 302 and/or DRM credentials 304.

The device authentication credentials 302 can be digital certificates, private keys, and/or public keys that can be used to verify the identity of the client device 102 to the home media server 100 and/or to other servers in the network operator's network. In some embodiments, the device authentication credentials 302 can be Secure Sockets Layer (SSL) certificates and/or keys. In alternate embodiments, the device authentication credentials 302 can be certificates and/or keys utilized with any other secure key management protocol such as Internet Key Exchange (IKE or IKEv2).

The DRM credentials 304 can be Digital Transmission Content Protection over Internet Protocol (DTCP-IP) certificates and/or keys. DTCP-IP is a scheme that provides for encryption and/or copy protection of media content as it is moved from one device to another device over a data connection. By way of a non-limiting example, in a DTCP-IP system a home media server 100, such as a DVR, can record media content, encrypt that media content using DTCP-IP, and then stream the DTCP-IP encrypted media content to a client device 102 to maintain the media content's copy protection during transmission and to help prevent unauthorized copying. In alternate embodiments, the DRM credentials 304 can be any other type of credentials for digital rights management schemes, such as PlayReady-ND or HDCP 2.2 credentials.

At step 210, the PKI provisioning server 106 can send a validation request 310 to the client authorization server 104. The validation request 310 can include the service authorization credential 306 and subscriber identifier 308 received by the PKI provisioning server 106 from the client device 102.

At step 212, the client authorization server 104 can determine whether the service authorization credential 306 received as part of the validation request 310 matches the service authorization credential 306 that was sent by the client authorization server 104 to a client device 102 associated with the subscriber identifier 308 during step 206. If the client authorization server 104 confirms that the service authorization credential 306 received during step 210 matches the service authorization credential 306 previously sent to the client device 102 during step 206, the client authorization server 104 can send a validation response 312 to the PKI provisioning server 106 at step 214. The validation response 312 can indicate that the client device 102 was previously registered with the client authorization server 104. If the client authorization server 104 does not confirm that the service authorization credential 306 matches one it previously provided to the client device 102, then the validation request 310 can be rejected and the process can end. In alternate embodiments in which the client device 102 self-generated the service authorization credential 306 from a username and/or password, the client authorization server 104 can extract the username and/or password, verify them against usernames and/or passwords in its records to validate the service authorization credential 306, and send a validation response 310 if the service authorization credential 306 is validated. In some embodiments the username can be the same as the subscriber identifier 308 associated with a user. In some embodiments the password can be encrypted while the username or subscriber identifier 308 remains unencrypted, while in other embodiments both the username and password can be encrypted.

At step 216, after receipt of an affirmative validation response 310 by the PKI provisioning server 106, the PKI provisioning server 106 can transfer the requested device authentication credentials 302 and/or DRM credentials 304 to the client device 102. The device authentication credentials 302 and/or DRM credentials 304 provided to the client device 102 can be associated with certificate identifiers 314. The certificate identifier 314 can be a sequence number, alphanumeric code, or any other identifier that can uniquely identify the particular device authentication credentials 302 and/or DRM credentials 304 passed to the client device 102 from the PKI provisioning server 106.

At step 218, the client device 102 can use its device authentication credentials 302 to establish a secure session between the client device 102 and the home media server 100. By way of a non-limiting example, the device authentication credentials 302 can include a digital certificate and a private key that can be used by the client device 102 to establish an encrypted and authenticated SSL or Transport Layer Security (TLS) session with the home media server 100.

At step 220, the client device 102 can send a provisioning request 316 to the home media server 100 over the secure session established in step 216. The provisioning request 316 can be a request that the client device 102 be authorized to receive media streams from the home media server 100. The provisioning request 316 can comprise the optional service authorization credential 306 received by the client device 102 from the client authorization server 104 during step 206, the subscriber identifier 308 associated with the client device 102, the certificate identifiers 314 associated with the device authentication credentials 302 and/or DRM credentials 304 received by the client device 102 from the PKI provisioning server 106 during step 216, and a client device identifier 318 associated with the client device 102. The client device identifier 318 can be a unique identifier associated with a particular client device 102, such as a number, alphanumeric code, serial number, or any other piece of data that can uniquely identify a particular client device 102.

At step 222, the home media server 100 can determine whether the client device 102 that sent the provisioning request 316 has been previously registered with or authorized by the client authorization server 104. The home media server 100 can extract the service authorization credential 306 and subscriber identifier 308 from the provisioning request 316, and can send the service authorization credential 306 and subscriber identifier 308 to the client authorization server 104. If the client authorization server 104 confirms that the service authorization credential 306 is valid for the client device 102, such as by confirming that the service authorization credential 306 matches the service authorization credential 306 that was sent by the client authorization server 104 to a client device 102 associated with the subscriber identifier 308 during step 206, that a password and username or subscriber identifier 308 in a client device-generated service authorization credential 306 matches information in its records, or that a timestamp within the service authorization credential indicates that an expiration period has not yet expired, the home media server 100 can move to step 224. If the client authorization server 104 does not validate the service authorization credential 306, the home media server 100 can reject the provisioning request 316 and the process can end.

At step 224, the home media server 100 can send an activation request 320 to the client authorization server 104. The activation request 320 can be a request for the client authorization server 104 to authorize the home media server 100 to transmit media content to the client device 102. The activation request 320 sent by the home media server 100 to the client authorization server 104 can contain the subscriber identifier 308 associated with the client device 102, the certificate identifiers 314 associated with the device authentication credentials 302 and/or DRM credentials 304, the client device identifier 318 associated with the client device 102, and a home media server identifier 322. The home media server identifier 322 can be a unique identifier, such as a number, alphanumeric code, serial number, or any other unique identifier associated with the home media server 100.

At step 226, the client authorization server 104 can use the home media server identifier 322 to find a subscriber identifier 308 associated with the home media server 100 in a database maintained by the network operator. If the subscriber identifier 308 associated with the home media server 100 in the client authorization server's records, such as a subscriber identifier 308 associated with a particular user account tied to that home media server 100, matches the subscriber identifier 308 associated with the client device 102 in the activation request 320, then the client authorization server 104 can move to step 228. If the subscriber identifier 308 associated with the home media server 100 in the client authorization server's records does not match the subscriber identifier 308 associated with the client device 102 in the activation request 320, then the client authorization server 104 can reject the activation request 320 and the process can end.

At step 228, the client authorization server 104 can look up a circuit identifier 324 and/or service package information 326 associated with the subscriber identifier 308 or the user account tied to the subscriber identifier 308.

The circuit identifier 324 can be an identifier, such as a number, alphanumeric code, or any other unique identifier, that identifies a physical network connection between the network operator and the home media server 100. By way of a non-limiting example, a circuit identifier 324 can identify a particular cable connection running from the network operator to a subscriber's home and into the home media server 100 to deliver television, internet, or other data content.

Service package information 326 can describe services that a particular subscriber has been granted access to by the network operator, such as whether the subscriber has been authorized to stream and/or transfer media content from a home media server 100 to one or more client devices 102. By way of a non-limiting example, some network operators offer different service levels or options, such that some subscribers can be authorized to stream media content from a home media server 100 to client devices 102 while others are not authorized to do so depending on the service package they have ordered.

At step 230, the client authorization server 104 can save information received and/or looked up in previous steps regarding the client device 102, subscriber, and home media server 100 in a database, such as the subscriber identifier 308, certificate identifiers 314, client device identifier 318, home media server identifier 322, circuit identifier 324, and/or service package information 326.

At step 232, the client authorization server 104 can determine whether to authorize the home media server 100 to transfer and/or stream media content to the client device 102 that submitted the provisioning request 316. If the service package information 326 and other information saved during step 230 indicates that the subscriber associated with the home media server 100 has a service package that allows streaming and/or transfer of media content from the home media server 100 to a client device 102, the client authorization server 104 can send an activation response 328 to the home media server 100 at step 234. The activation response 328 can authorize the home media server 100 to stream and/or transfer media content to the client device 102. If the service package information 326 and other information saved during step 230 does not indicate that the subscriber associated with the home media server 100 has a service package that allows streaming and/or transfer of media content from the home media server 100 to a client device 102, the client authorization server 104 can reject the activation request 320 and the process can end.

At step 236, the home media server 100 can send a provisioning response 330 to the client device 102. The provisioning response 330 can be a response to the provisioning request 316 sent by the client device 102 in step 218 that informs the client device 102 that the home media server 100 has been approved by the client authorization server 104 to stream media content to the client device 102.

The client device 102 can subsequently receive media content from the home media server 100. The media content received by the client device 102 can have been encrypted by the home media server 100 using a DRM or copy protection session established with the DRM credentials 304, and the client device 102 can decrypt the media content based on the established DRM session to playback the media content.

DRM credentials 304 can be provided to home media servers 100 and client devices 102, such that the home media servers 100 can protect outgoing media content with the DRM credentials 304 and only client devices 102 with the specific DRM credentials 304 that match the certificate identifiers 314 passed to the home media server 100 in step 218 can access or copy incoming media content. By way of a non-limiting example, various DRM credentials 304 can be pre-installed on the home media server 100 during manufacturing or at any other time.

Figure 4A:
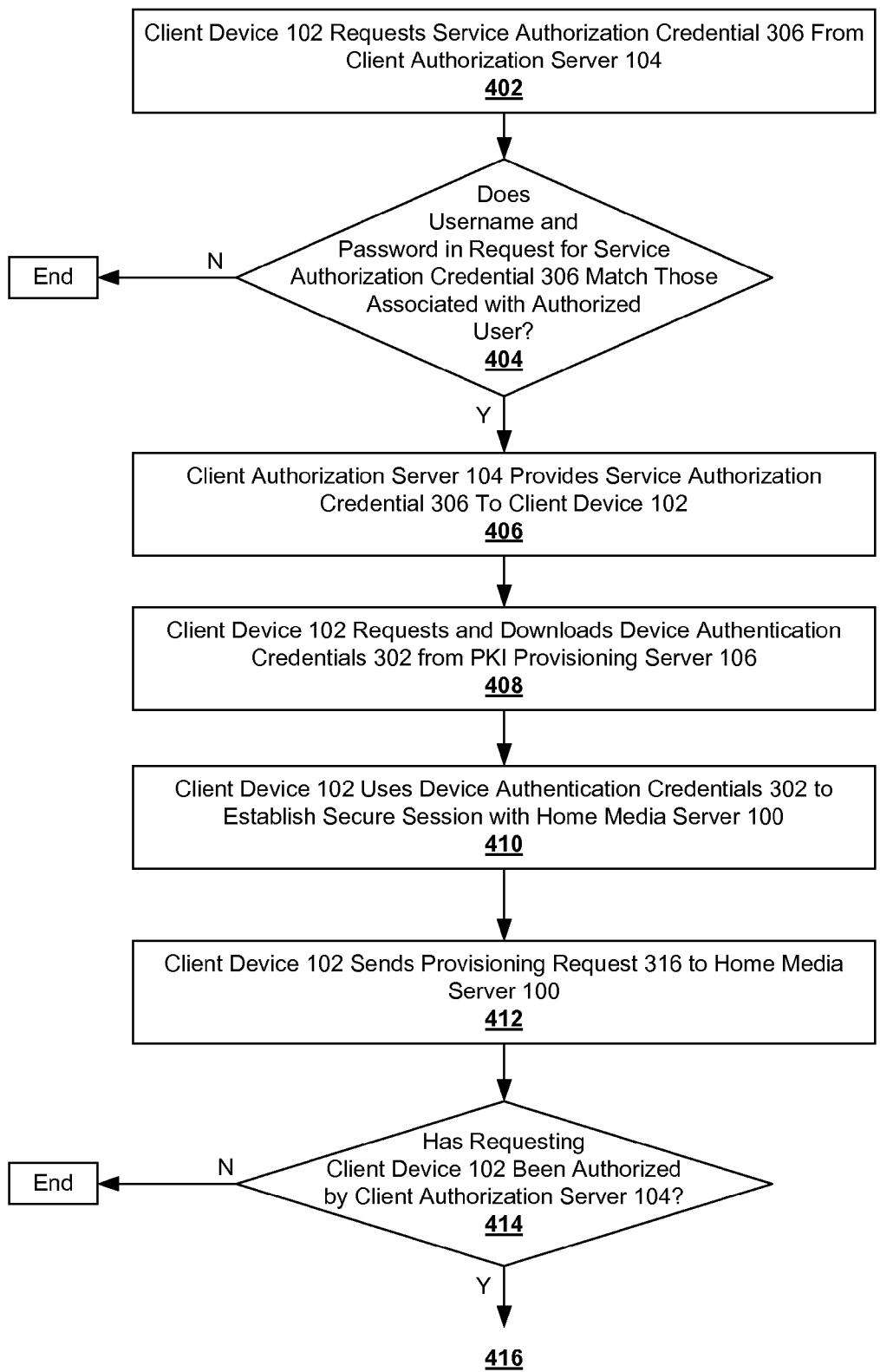
FIGS. 4A-4C depict a second method for authorizing media content transfer between a home media server and a client device and for providing DRM credentials to the client device.
Figure 4B:
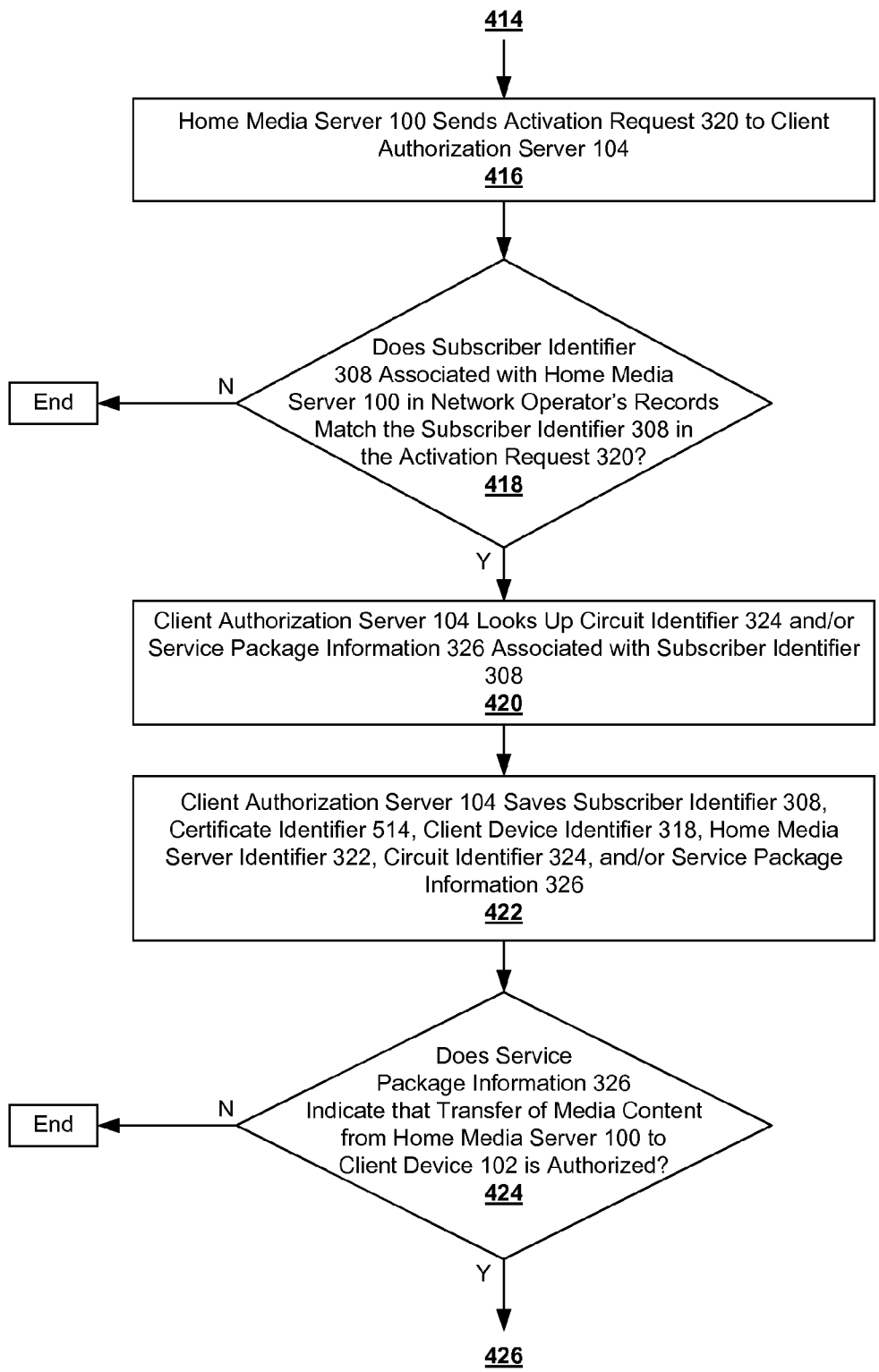
Figure 4C:
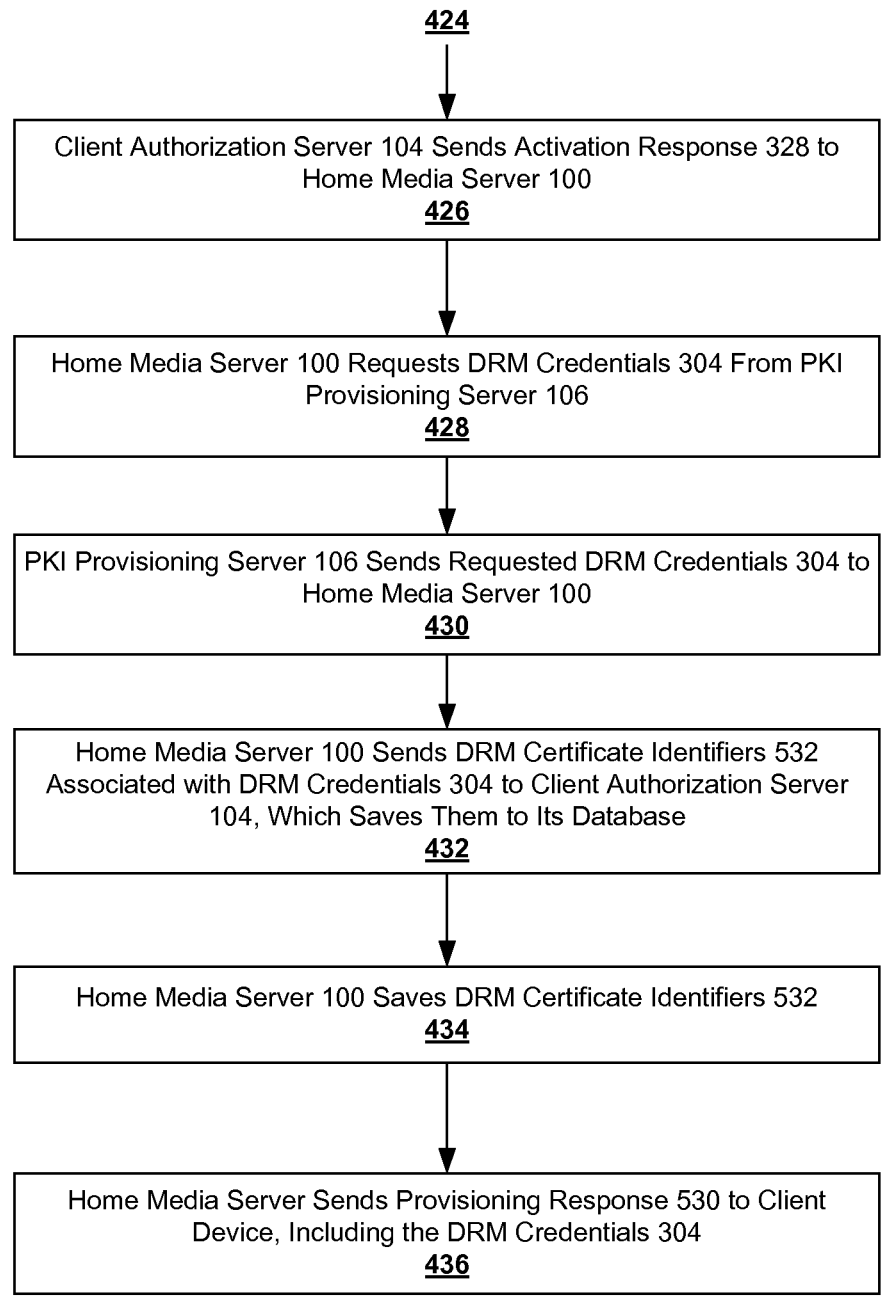
Figure 5:
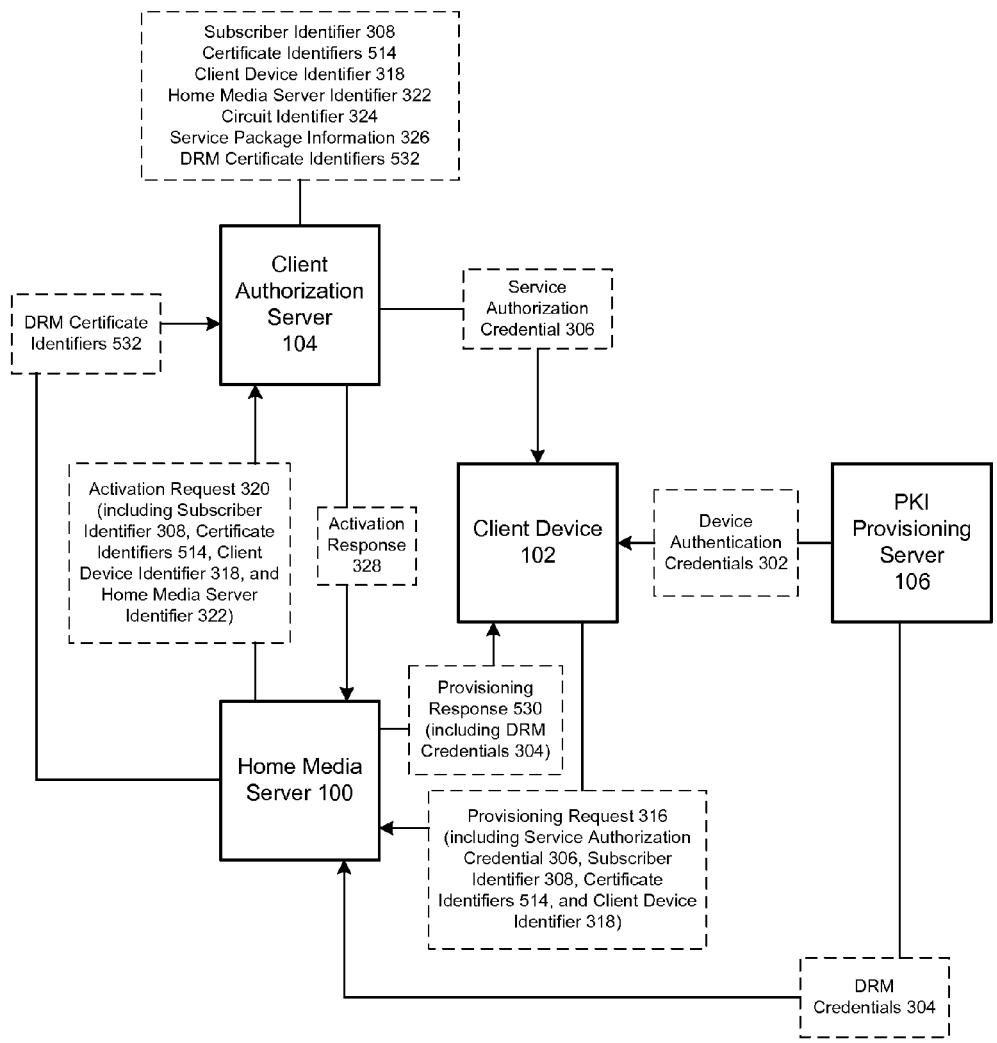
FIG. 5 depicts an exemplary operating environment for practicing the second method of FIGS. 4A-4C.

FIGS. 4A-4C depict a second exemplary process for setting up a client device 102 to receive encrypted media content from a home media server 100 by providing the client device 102 with device authentication credentials 302 and/or DRM credentials 304. In this embodiment, the system of FIG. 5 can be used, in which the PKI provisioning server 106 can be in communication with the home media server 100.

At step 402, the client device 102 can request a service authorization credential 306 from the client authorization server 104. As discussed above with respect to FIG. 2, in some embodiments the client device 102 can forward a username and password tied to a user account with a network operator and/or subscriber identifier 308 to the client authorization server 104 as part of a request for a service authorization credential 306.

At step 404, the client authorization server 104 can determine whether the username and password submitted by the client device 102 matches a username and password associated with an authorized user account in the network operator's records. If the client authorization server 104 verifies that the username and password submitted by the client device 102 matches a username and password associated with one of its authorized user accounts, the client authorization server 104 can send a service authorization credential 306 to the client device 102 at step 406. The service authorization credential 306 can indicate that the client device 102 has been registered with the network operator. If the client authorization server 104 does not verify that the username and password submitted by the client device 102 matches a username and password associated with one of its authorized user accounts, the client authorization server 104 can reject the request and the process can end.

In alternate embodiments steps 402-406 can be skipped, and the client device 102 can locally generate the service authorization credential 306 from a username and/or password entered into the client device 102 by a user. The client device 102 can encrypt the username and/or password to create the service authorization credential 306. In some embodiments, the username can be the subscriber identifier 308.

At step 408, the client device 102 can request and download device authentication credentials 302 from the PKI provisioning server 106. The device authentication credentials 302 can be digital certificates, private keys, and/or public keys that can be used to verify the identity of the client device 102 to the home media server 100 and/or to other servers in the network operator's network. In some embodiments, the device authentication credentials 302 can be Secure Sockets Layer (SSL) certificates and/or keys. In alternate embodiments, the device authentication credentials 302 can be certificates and/or keys utilized with any other secure key management protocol such as Internet Key Exchange (IKE or IKEv2). The device authentication credentials 302 can be associated with a certificate identifier 514. The certificate identifier 514 can be a sequence number, alphanumeric code, or any other identifier that can uniquely identify the particular device authentication credentials 302 passed to the client device 102 from the PKI provisioning server 106.

At step 410, the client device 102 can use its device authentication credentials 302 to establish a secure session between the client device 102 and the home media server 100. By way of a non-limiting example, the device authentication credentials 302 can include a digital certificate and a private key that can be used by the client device 102 to establish an encrypted and authenticated SSL or Transport Layer Security (TLS) session with the home media server 100.

At step 412, the client device 102 can send a provisioning request 316 to the home media server 100 over the secure session established in step 410. The provisioning request 316 can be a request that the client device 102 be authorized to receive media streams from the home media server 100. The provisioning request 316 can comprise the service authorization credential 306 received by the client device 102 from the client authorization server 104 during step 406, the subscriber identifier 308 associated with the client device 102, the certificate identifiers 514 associated with the device authentication credentials 302 received by the client device 102 from the PKI provisioning server 106 during step 408, and a client device identifier 318 associated with the client device 102.

At step 414, the home media server 100 can determine whether the client device 102 that sent the provisioning request 316 has been previously registered with or authorized by the client authorization server 104. The home media server 100 can extract the service authorization credential 306 and subscriber identifier 308 from the provisioning request 316, and can send the service authorization credential 306 and subscriber identifier 308 to the client authorization server 104. If the client authorization server 104 confirms that the service authorization credential 306 is valid for the client device 102, such as by confirming that the service authorization credential 306 matches the service authorization credential 306 that was sent by the client authorization server 104 to a client device 102 associated with the subscriber identifier 308 during step 406, that a username and password embedded in a client device-generated service authorization credential 306 matches information in its records, or that a timestamp within the service authorization credential indicates that an expiration period has not yet expired, the home media server 100 can move to step 416. If the client authorization server 104 does not validate the service authorization credential 306, the home media server 100 can reject the provisioning request 316 and the process can end.

At step 416, the home media server 100 can send an activation request 320 to the client authorization server 104. The activation request 320 can be a request for the client authorization server 104 to authorize the home media server 100 to transmit media content to the client device 102. The activation request 320 sent by the home media server 100 to the client authorization server 104 can contain the subscriber identifier 308 associated with the client device 102, the certificate identifiers 514 associated with the device authentication credentials 302, the client device identifier 318 associated with the client device 102, and a home media server identifier 322 associated with the home media server 100.

At step 418, the client authorization server 104 can use the home media server identifier 322 to find a subscriber identifier 308 associated with the home media server 100 in a database maintained by the network operator. If the subscriber identifier 308 associated with the home media server 100 in the client authorization server's records, such as a subscriber identifier 308 associated with a particular user account tied to that home media server 100, matches the subscriber identifier 308 associated with the client device 102 in the activation request 320, then the client authorization server 104 can move to step 420. If the subscriber identifier 308 associated with the home media server 100 in the client authorization server's records does not match the subscriber identifier 308 associated with the client device 102 in the activation request 320, then the client authorization server 104 can reject the activation request 320 and the process can end.

At step 420, the client authorization server 104 can look up a circuit identifier 324 and/or service package information 326 associated with the subscriber identifier 308 or the user account tied to the subscriber identifier 308.

At step 422, the client authorization server 104 can save information received and/or looked up in previous steps regarding the client device 102, subscriber, and home media server 100 in a database, such as the subscriber identifier 308, certificate identifiers 514, client device identifier 318, home media server identifier 322, circuit identifier 324, and/or service package information 326.

At step 424, the client authorization server 104 can determine whether to authorize the home media server 100 to transfer and/or stream media content to the client device 102 that submitted the provisioning request 316. If the service package information 326 and other information saved during step 424 indicates that the subscriber associated with the home media server 100 has a service package that allows streaming and/or transfer of media content from the home media server 100 to a client device 102, the client authorization server 104 can send an activation response 328 to the home media server 100 at step 426. The activation response 328 can authorize the home media server 100 to stream and/or transfer media content to the client device 102. If the service package information 326 and other information saved during step 422 does not indicate that the subscriber associated with the home media server 100 has a service package that allows streaming and/or transfer of media content from the home media server 100 to a client device 102, the client authorization server 104 can reject the activation request 320 and the process can end.

At step 428, the home media server 100 can request DRM credentials 304 from the PKI provisioning server 106. As discussed above with respect to FIG. 2, in some embodiments DRM credentials 304 can be DTCP-IP certificates and/or keys.

At step 430, the PKI provisioning server 106 can transfer the requested DRM credentials 304 to the home media server 100. The DRM credentials 304 provided to the home media server 100 can be associated with a DRM certificate identifier 532. The DRM certificate identifier 532 can be a sequence number, alphanumeric code, or any other identifier that can uniquely identify the particular DRM credential 304 passed to the home media server 100 from the PKI provisioning server 106.

At step 432, the home media server 100 can forward the DRM certificate identifier 532 associated with the received DRM credentials 304, along with the client device identifier 318, to the client authorization server 104. The client authorization server 104 can save the DRM certificate identifier 532 in its database with other information associated with the client device identifier 318, such as the subscriber identifier 308, certificate identifiers 514, home media server identifier 322, circuit identifier 324, and/or service package information 326 as described with respect to step 422.

At step 434, the home media server 100 can save the DRM certificate identifier 532 associated with the DRM credentials 304 received in step 430.

At step 436, the home media server 100 can send a provisioning response 530 to the client device 102. The provisioning response 530 can be a response to the provisioning request 316 sent by the client device 102 in step 412 that informs the client device 102 that the home media server 100 has been approved by the client authorization server 104 to stream media content to the client device 102. In this embodiment, the provisioning response 530 sent by the home media server 100 to the client device 102 can include the DRM credentials 304 received by the home media server 100 in step 430.

The client device 102 can subsequently receive media content from the home media server 100. The media content received by the client device 102 can have been encrypted by the home media server 100 using a DRM or copy protection session established with the DRM credentials 304, and the client device 102 can decrypt the media content based on the established DRM session to playback the media content.

DRM credentials 304 can be provided to home media servers 100 and client devices 102, such that the home media servers 100 can protect outgoing media content with the DRM credentials 304 and only client devices 102 with the specific DRM credentials 304 that match the DRM certificate identifiers 532 saved by the home media server 100 in step 434 can access or copy incoming media content. By way of a non-limiting example, various DRM credentials 304 can be pre-installed on the home media server 100 during manufacturing or at any other time.

In some embodiments, some or all of the processes of FIG. 2A-2C or 4A-4C can be repeated for additional home media servers 100 and/or client devices 102 that are tied to a single subscriber identifier 308. By way of a non-limiting example, a user can have two or more home media servers 100 installed within their home, and the user can desire to have a particular client device 102 authorized to access media content from each home media server 100 associated with the user's account. In these situations, the client device 102 can submit a separate provisioning request 316 for each home media server 100 as each home media server 100 is discovered or identified.

In some embodiments, the process for provisioning client devices 102 with subsequent home media servers 100 can differ from the process of provisioning with the first home media server 100. By way of a non-limiting example, the client device 102 can be provisioned with DRM credentials 304 using the process of FIGS. 2A-2C or FIGS. 4A-4C, however thereafter the client device 102 can include a DRM certificate identifier 532 associated with the DRM credentials 304 it has already received in a second provisioning request 316 to the second home media server 100. Because the second provisioning request 316 already includes the DRM certificate identifier 532, the home media server 100 and/or client device 102 can skip steps involved in requesting new DRM credentials 304.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed:

1. A method of provisioning DRM credentials on a client device, comprising:
    receiving a provisioning request at a home media server from a client device, wherein said provisioning request comprises a service authorization credential;
    validating said provisioning request at said home media server by sending an activation request to a client authorization server, wherein said activation request comprises said service authorization credential;
    receiving an activation response at said home media server if said client authorization server validates said provisioning request by verifying said service authorization credential;
    downloading DRM credentials to said home media server from a PKI provisioning server if said home media server received said activation response;
    saving DRM certificate identifiers associated with said DRM credentials to said home media server; and
    sending a provisioning response from said home media server to said client device, wherein said provisioning response comprises said DRM credentials.

2. The method of claim 1, further comprising passing said DRM certificate identifiers from said home media server to said client authorization server.

3. The method of claim 2, wherein said DRM credentials are DTCP-IP certificates and keys.

4. The method of claim 1, wherein said provisioning request comprises device authentication credentials received by said client device from said PKI provisioning server.

5. The method of claim 1, wherein said service authorization credential was received by said client device from said client authorization server prior to the client device sending said provisioning request.

6. The method of claim 1, wherein said service authorization credential was locally generated on said client device by encrypting a subscriber identifier.

7. The method of claim 6, wherein said client authorization server verifies said service authorization credential by extracting said subscriber identifier and checking said subscriber identifier against records associated with said client device at said client authorization server.

\* \* \* \* \*